(12) United States Patent
Lee et al.

(10) Patent No.: US 9,902,361 B2
(45) Date of Patent: Feb. 27, 2018

(54) CENTER AIRBAG DEVICE

(71) Applicant: TOYODA GOSEI CO., LTD., Kiyosu-shi, Aichi-ken (JP)

(72) Inventors: Eugene Lee, Troy, MI (US); Aviral Shrivatri, Livonia, MI (US); Shiro Ohara, Ypsilanti, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/055,855

(22) Filed: Feb. 29, 2016

(65) Prior Publication Data
US 2017/0247007 A1 Aug. 31, 2017

(51) Int. Cl.
*B60R 21/205* (2011.01)
*B60R 21/2338* (2011.01)
*B60R 21/00* (2006.01)

(52) U.S. Cl.
CPC ........ *B60R 21/205* (2013.01); *B60R 21/2338* (2013.01); *B60R 2021/0004* (2013.01); *B60R 2021/0048* (2013.01); *B60R 2021/23382* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,262,931 A * | 4/1981 | Strasser | ................ | B60R 21/233 280/729 |
| 5,845,935 A * | 12/1998 | Enders | .............. | B60R 21/23138 280/730.1 |
| 9,469,270 B2 * | 10/2016 | Abe | ....................... | B60R 21/233 |
| 2002/0036401 A1 * | 3/2002 | Tokita | ................... | B60R 21/233 280/743.2 |
| 2003/0057691 A1 * | 3/2003 | Tokita | ................... | B60R 21/233 280/743.2 |
| 2007/0096439 A1 * | 5/2007 | Kashiwagi | ............ | B60R 21/206 280/728.2 |
| 2007/0152435 A1 * | 7/2007 | Jamison | ................ | B60R 21/233 280/743.2 |
| 2010/0270780 A1 * | 10/2010 | Moritani | ............... | B60R 21/206 280/730.1 |
| 2012/0025498 A1 * | 2/2012 | Tanaka | ................... | B60R 21/233 280/730.2 |

(Continued)

FOREIGN PATENT DOCUMENTS

JP 5229205 B2 * 7/2013
JP 2015-157602 A 9/2015

*Primary Examiner* — Nicole T Verley
(74) *Attorney, Agent, or Firm* — Posz Law Group, PLC

(57) ABSTRACT

A center airbag device is arranged in an instrument panel of a vehicle and located in a middle portion of the instrument panel with respect to a lateral direction of the vehicle. The center airbag device includes an airbag deployed and inflated when supplied with gas. The airbag includes a basal portion located on an upper surface of the instrument panel when the airbag is deployed and inflated, a protection portion located rearward from the basal portion and extended downward when the airbag is deployed and inflated, and an auxiliary portion located between the basal portion and the protection portion. The auxiliary portion allows the protection portion to be bent relative to the basal portion when the airbag is deployed and inflated.

14 Claims, 6 Drawing Sheets

(56) References Cited

U.S. PATENT DOCUMENTS

| | | | |
|---|---|---|---|
| 2015/0367802 A1* | 12/2015 | Fukawatase | B60R 21/205 280/732 |
| 2016/0046253 A1* | 2/2016 | Jung | B60R 21/206 280/729 |
| 2016/0107598 A1* | 4/2016 | Fischer | B60R 21/231 280/729 |
| 2016/0159312 A1* | 6/2016 | Sato | B60R 21/233 280/729 |
| 2017/0015270 A1* | 1/2017 | Ohno | B60R 21/233 |
| 2017/0028954 A1* | 2/2017 | Sumiya | B60R 21/205 |

\* cited by examiner

CENTER AIRBAG DEVICE

BACKGROUND OF THE INVENTION

The present invention relates to an airbag device installed in an instrument panel of a vehicle at a middle portion of the instrument panel with respect to the lateral direction of the vehicle and including an airbag deployed and inflated when supplied with gas.

Japanese Laid-Open Patent Publication No. 2015-157602 describes a known device that protects vehicle occupants during a frontal vehicle collision. A driver-side airbag is deployed and inflated in front of the driver seat to cover the upper side of the steering wheel. A passenger-side airbag is deployed and inflated in front of the passenger seat toward the rear from the instrument panel. A center airbag is deployed and inflated between the driver-side airbag and the passenger-side airbag to protect the vehicle occupants during an angled frontal vehicle collision.

In the device described in the above patent publication, the center airbag is located between the passenger-side airbag and the driver-side airbag. This restricts movement of the center airbag in the lateral direction of the vehicle. Further, the center airbag protects a vehicle occupant forced toward the middle of the instrument panel with respect to the lateral direction of the instrument panel.

The center airbag of the device described in the above patent publication is located between the driver-side airbag and the passenger-side airbag. Thus, the center airbag has a large volume. However, the middle of the instrument panel is where many devices are located, such as the air conditioning device and the navigation device. This makes it difficult to make room for the large-volume airbag.

It is an object of the present invention to provide a center airbag that stably protects a vehicle occupant who is forced toward the middle of the instrument panel with respect to the lateral direction of a vehicle.

SUMMARY OF THE INVENTION

To achieve the above object, one aspect of the present invention provides a center airbag device arranged in an instrument panel of a vehicle and located in a middle portion of the instrument panel with respect to a lateral direction of the vehicle. The center airbag device includes an airbag deployed and inflated when supplied with gas. The airbag includes a basal portion located on an upper surface of the instrument panel when the airbag is deployed and inflated, a protection portion located rearward from the basal portion and extended downward when the airbag is deployed and inflated, and an auxiliary portion located between the basal portion and the protection portion. The auxiliary portion allows the protection portion to be bent relative to the basal portion when the airbag is deployed and inflated.

Inflation of the auxiliary portion between the basal portion and the protection portion bends the protection portion relative to the basal portion. This arranges the airbag over the ornamental portion of the instrument panel including the upper surface of the instrumental panel and a surface extending toward the lower side from the middle portion of the upper surface. Thus, the airbag is supported by the ornamental surface of the instrument panel over a wide area. This limits movement of the airbag in the lateral direction of the vehicle. Accordingly, the airbag stably protects the vehicle occupant who is forced toward the middle portion of the instrument panel.

Preferably, in the center airbag device, the protection portion includes a protection portion body and a projection located at a position corresponding to at least a head of a vehicle occupant. The projection projects from the protection portion body and is configured to contact the head.

In this structure, the vehicle occupant does not directly hit the instrument panel due to the protection portion body. Further, contact of the projection with the head of the vehicle occupant restricts head rotation.

Preferably, in the center airbag device, the projection includes an upper projection that is configured to contact the head of the vehicle occupant and a lower projection located downward from the upper projection. The lower projection is configured to contact a shoulder of the vehicle occupant to restrain the shoulder.

In this structure, the head of the vehicle occupant contacts the upper projection, and the shoulder contacts the lower projection. This appropriately restricts head rotation and appropriately restrains the shoulder.

Preferably, in the center airbag device, the airbag includes a narrowed portion between the upper projection and the lower projection.

In this structure, the surface area of the upper projection and the surface area of the lower projection may be easily changed by changing the location and size of the narrowed portion. Thus, the area in which the upper projection and the lower projection contact the head and shoulder of the vehicle occupant may be set in an appropriate manner to appropriately protect the head and the shoulder of the vehicle occupant.

Preferably, in the center airbag device, the upper projection is in communication with the lower projection, and the airbag includes a through hole extending through the airbag in the lateral direction of the vehicle. The through hole is located between the upper projection and the lower projection.

In this structure, the through hole facilitates the formation of the narrowed portion.

Preferably, in the center airbag device, the airbag includes a tether located between the upper projection and the lower projection.

In this structure, the tether allows the narrowed portion to be formed between the upper projection and the lower projection.

Preferably, in the center airbag device, the projection is located in a middle portion of the protection portion body with respect to the lateral direction of the vehicle.

In this structure, when an angled collision occurs at the left or right front side of the vehicle, the projection will contact the head of the vehicle occupant on the driver seat or the head of the vehicle occupant on the passenger seat who is forced toward the middle portion of the instrument panel. This restricts head rotation Preferably, in the center airbag device, the basal portion is one of a plurality of basal portions located next to each other in a front-to-rear direction of the vehicle, and the airbag includes a constricted portion between the basal portions that are located next to each other. The constricted portion includes a constricted outer surface.

In this structure, the constricted portion is arranged between the basal portions that are located next to each other. This allows the basal portions to move relative to each other and allows the basal portions to easily extend along the upper surface of the instrument panel, while decreasing the volume of the basal portions. Accordingly, the basal portions and, consequently, the airbag may be reduced in size. Further, the area of contact between the upper surface of the instrument panel and the basal portions may be increased. This limits movement of the airbag in the lateral direction of the vehicle.

Preferably, in the center airbag device, a front one of the basal portions has a larger volume than a rear one of the basal portions.

In this structure, the front basal portion, which has a larger volume than the rear basal portion, forces the rear basal portion out toward the rear. Further, the rear basal portion serves as a wall that restricts upward movement of the rear basal portion and the return of the rear basal portion toward the front.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment will now be described with reference to FIGS. 1 to 7.

Figure 1:
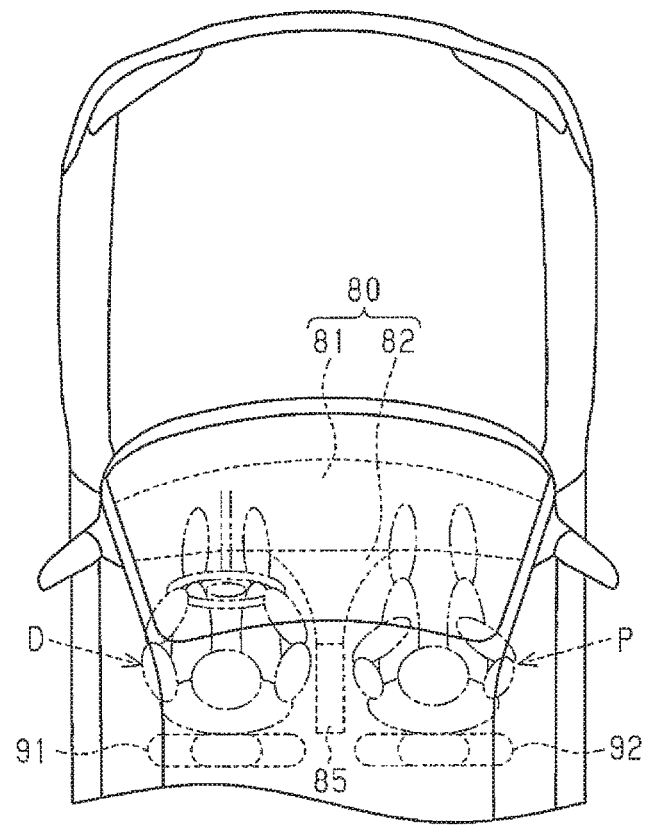
FIG. 1 is a plan view showing a front portion of an automobile that includes one embodiment of a center airbag device.

As shown in FIG. 1, an automobile includes a driver seat 91 and a passenger seat 92 in a front portion of the passenger compartment. In the automobile of the present embodiment, the driver seat 91 is located at the left side when facing toward the front of the vehicle. In the description hereafter, the front-to-rear direction of the vehicle will simply be referred to as the front-rear direction.

An instrument panel 80 extends in the lateral direction of the vehicle in front of the driver seat 91 and the passenger seat 92.

Figure 2:
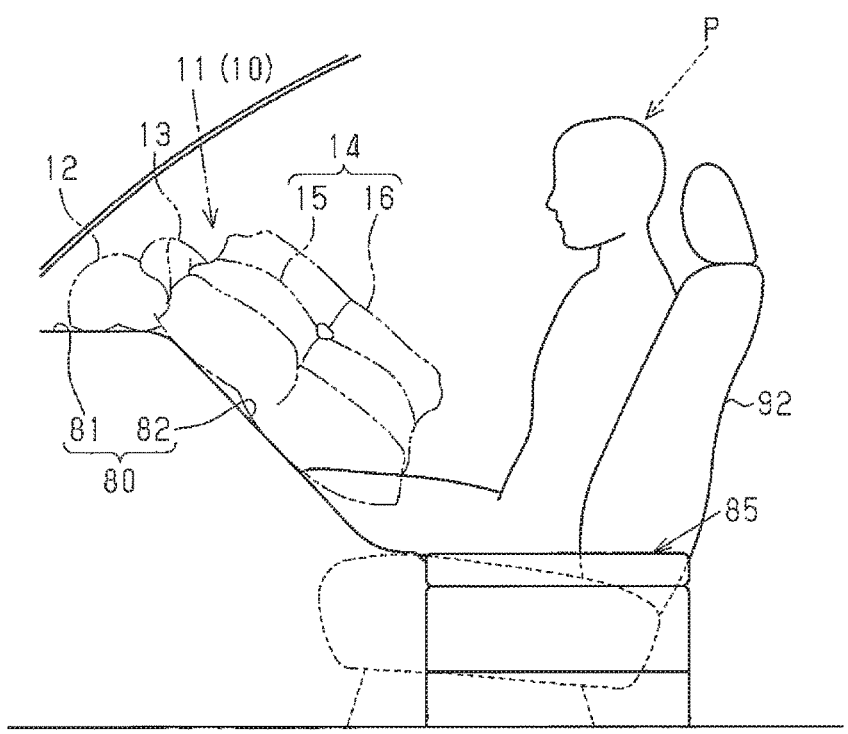
FIG. 2 is a side view showing an instrument panel and a passenger seat of the automobile.

As shown in FIGS. 1 and 2, the instrument panel 80 includes an upper surface 81. An inclined surface 82 extends diagonally downward and toward the rear from a rear edge of the upper surface 81 at a middle portion of the instrument panel 80 with respect to the lateral direction of the vehicle. The portion including the inclined surface 82 may be referred to as the center cluster. The inclined surface 82 includes the display of a navigation device and the outlet of an air conditioning device (not shown). A console box 85 is arranged between the driver seat 91 and the passenger seat 92 extending in the front-rear direction.

Figure 3:
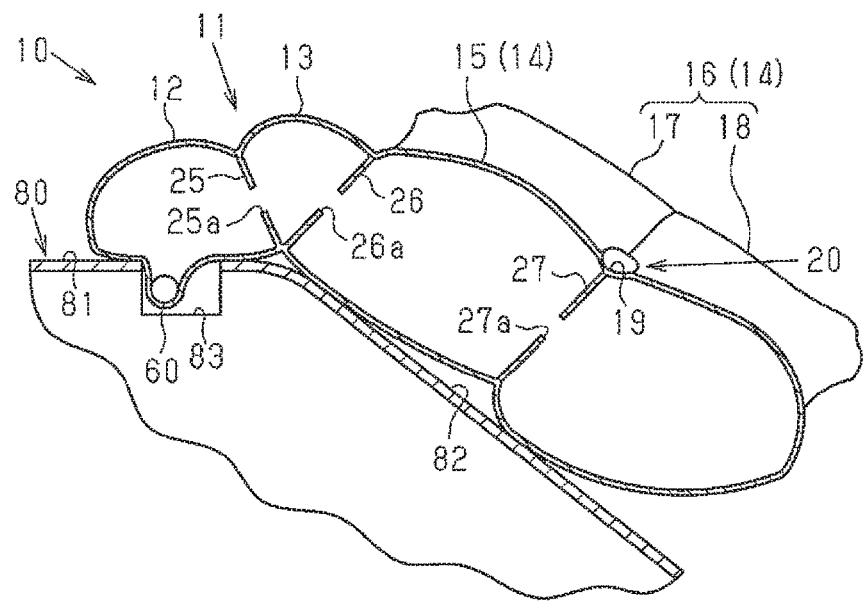
FIG. 3 is a cross-sectional view of the instrument panel and the airbag when deployed and inflated.

Referring to FIGS. 2 and 3, the middle portion of the instrument panel 80 includes a storage 83 that stores the center airbag device 10.

The center airbag device 10 includes an inflator 60, which is fixed to the inside of the storage 83, and an airbag 11, which is deployed and inflated by gas supplied from the inflator 60. The inflator 60 of the present embodiment is of a cylinder-type but may be of a disk-type.

The airbag 11 includes a basal portion 12, a protection portion 14, and an auxiliary portion 13. When the airbag 11 has been deployed and inflated, the basal portion 12 is located on the upper surface 81 of the instrument panel 80, the protection portion 14 is located toward the rear of the basal portion 12 and extended toward the lower side, and the auxiliary portion 13 is located between the basal portion 12 and the protection portion 14. The auxiliary portion 13 allows the protection portion 14 to be bent relative to the basal portion 12.

As shown in FIGS. 3, 5A, 5B, and 6, the protection portion 14 includes a protection portion body 15 and a projection 16, which projects upward from the protection portion body 15. The protection portion body 15 covers substantially the entire inclined surface 82 of the instrument panel 80. The projection 16 is located at the middle portion of the protection portion body 15 with respect to the lateral direction of the vehicle.

Figure 5A:
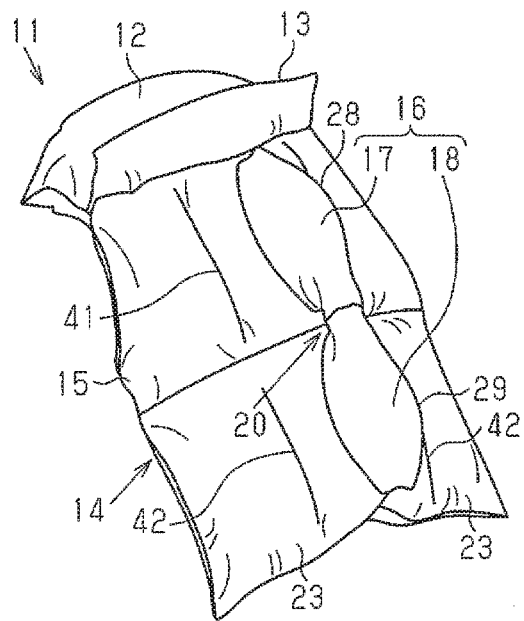
FIG. 5A is a perspective view of the airbag taken from the driver seat.
Figure 5B:
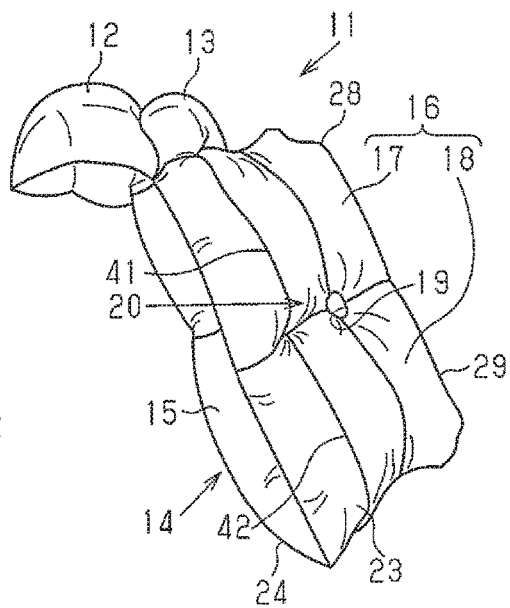
FIG. 5B is a side view of the airbag taken from the driver seat.

As shown in FIGS. 3, 5A, and 5B, the projection 16 includes an upper projection 17 and a lower projection 18. The upper projection 17 corresponds to the head H of a vehicle occupant P (D). The lower projection 18 corresponds to the shoulder S of the vehicle occupant P (D).

As shown in FIGS. 3 and 5B, the airbag 11 includes a through hole 19 located between the upper projection 17 and the lower projection 18. The through hole 19 extends in the lateral direction of the vehicle. The side surfaces of the projection 16 between the upper projection 17 and the lower projection 18 form a narrowed portion 20, which includes the through hole 19.

Figure 4:
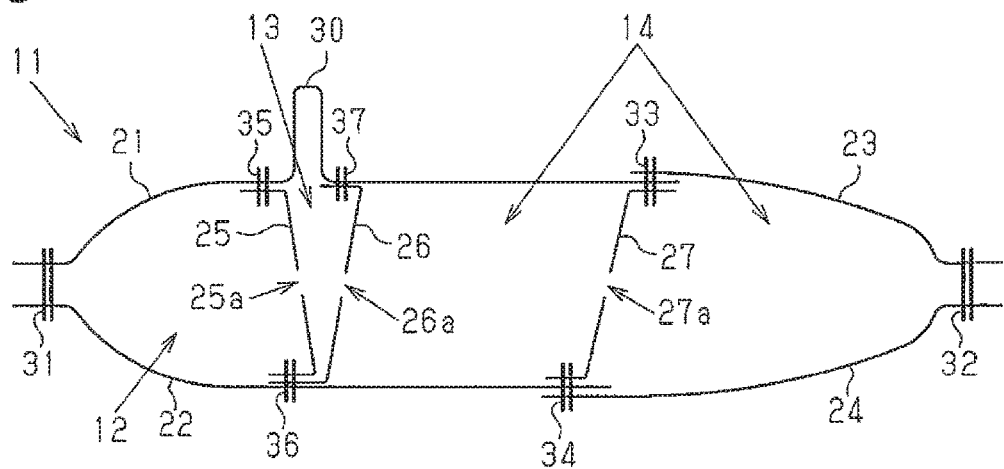
FIG. 4 is a schematic cross-sectional showing the inner structure of the airbag shown in FIG. 3.

The airbag 11 and the inner structure of the airbag 11 will now be described with reference to FIGS. 3, 4, and 6. FIG. 4 is a schematic cross-sectional view of the airbag 11 shown in FIG. 3.

As shown in FIG. 4, the airbag 11 includes a first fabric 21, a second fabric 22, a third fabric 23, and a fourth fabric 24. A first stitching 31 joins the front ends of the first fabric 21 and the second fabric 22. A second stitching 32 joins the rear ends of the third fabric 23 and the fourth fabric 24.

The first fabric 21 is vertically opposed to the second fabric 22. The third fabric 23 is vertically opposed to the fourth fabric 24. A third stitching 33 joins the rear end of the first fabric 21 and the front end of the third fabric 23. A fourth stitching 34 joins the rear end of the second fabric 22 and the front end of the fourth fabric 24.

A fifth stitching 35 joins the lower surface of the first fabric 21 and the upper end of a first tether 25, which includes a hole 25a. A sixth stitching 36 joins the upper surface of the second fabric 22 and the lower end of the first tether 25. The sixth stitching 36 also joins the upper surface of the second fabric 22 and the lower end of a second tether 26, which includes a hole 26a. A seventh stitching 37 joins the lower surface of the first fabric 21 and the upper end of the second tether 26.

The fifth stitching 35 and the seventh stitching 37 are located between the first stitching 31 and the third stitching 33. The seventh stitching 37 is located toward the rear from the fifth stitching 35 to form a slack portion 30 in the first fabric 21 between the fifth stitching 35 and the seventh stitching 37.

The sixth stitching 36 is located between the first stitching 31 and the fourth stitching 34. Further, the lower end of the first tether 25 and the lower end of the second tether 26 are joined by the same sixth stitching 36. Thus, the second fabric 22 does not include a portion corresponding to the slack portion 30. The slack portion 30 forms the auxiliary portion 13 with the first tether 25 and the second tether 26.

The third stitching 33 joins the rear end of the first fabric 21 and the upper end of a third tether 27, which includes a hole 27a. The fourth stitching 34 joins the rear end of the second fabric 22 and the lower end of the third tether 27.

Figure 6:
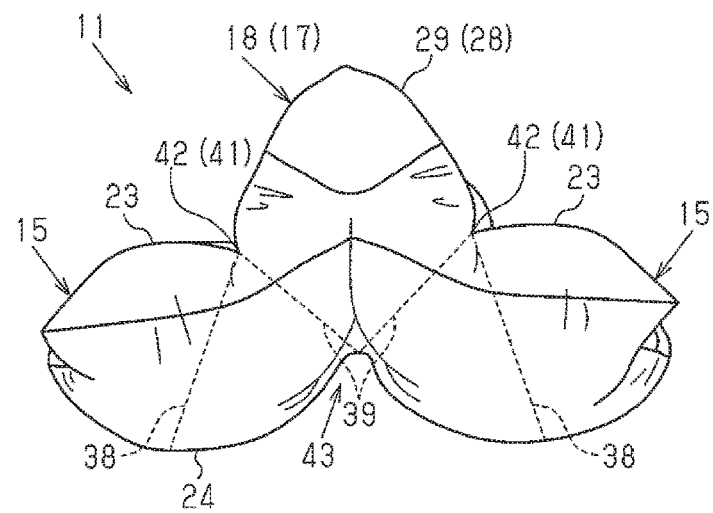
FIG. 6 is a bottom view showing the airbag when deployed and inflated.

As shown in FIGS. 5A, 5B, and 6, the airbag 11 includes a fabric 28, which corresponds to the upper projection 17, and a fabric 29, which corresponds to the lower projection 18.

As shown in FIG. 6, left and right outer tethers 38 extend between the lower surface of the third fabric 23 and the upper surface of the fourth fabric 24 to connect the third fabric 23 and the fourth fabric 24. The two outer tethers 38 are spaced apart in the lateral direction of the vehicle. Two inner tethers 39 are arranged between the outer tethers 38 to connect the third fabric 23 and the fourth fabric 24. The fabrics 28 and 29 and the tethers 38 and 39 cause the upper projection 17 and the lower projection 18 to be projected from the protection portion body 15 toward the vehicle occupant P (D). The tethers 38 and 39 form constricted portions 41 between the protection portion body 15 and the upper projection 17 and constricted portions 42 between the protection portion body 15 and the lower projection 18. The tethers 38 and 39 form a recess 43 in the rear middle portion of the protection portion body 15.

The center airbag device of the present embodiment has the advantages described below.

(1) When the airbag 11 has been deployed and inflated, the basal portion 12 is located on the upper surface 81 of the instrument panel 80, the protection portion 14 is located toward the rear from the basal portion 12 and extended toward the lower side, and the auxiliary portion 13 is located between the basal portion 12 and the protection portion 14 and bent relative to the basal portion 12.

Figure 7:
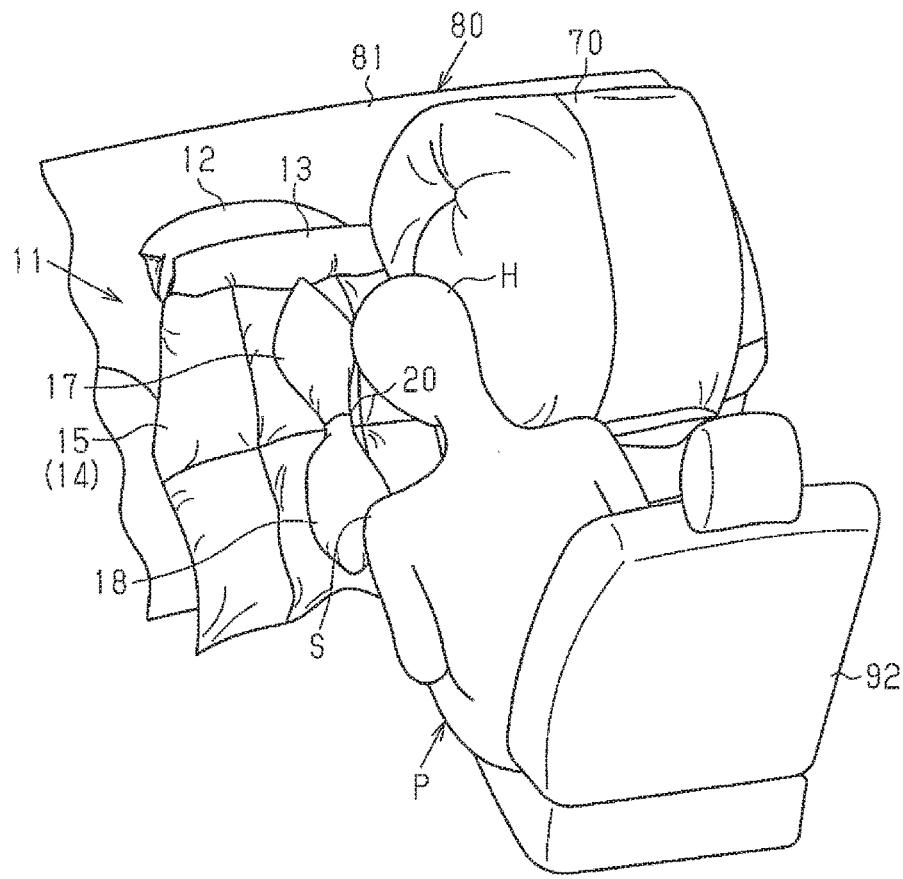
FIG. 7 is a perspective view illustrating the operation of the airbag.

For example, another automobile may collide at an angle with the front left side of the automobile including the center airbag device 10 of the present embodiment. In this case, as shown in FIG. 7, a passenger-side airbag 70 is deployed and inflated in front of the passenger seat 92. Further, the inflator 60 supplies gas to the center airbag device 10 to deploy and inflate the airbag 11. Here, the vehicle occupant P on the passenger seat 92 is forced toward the middle portion of the instrument panel 80.

As shown in FIG. 3, the inflation of the auxiliary portion 13 between the basal portion 12 of the airbag 11 and the protection portion 14 bends the protection portion 14 relative to the basal portion 12. This arranges the airbag 11 over the ornamental portion of the instrument panel 80 including the upper surface 81 and the inclined surface 82, which extends toward the lower side from the middle portion of the upper surface 81. Thus, the airbag 11 is supported by the ornamental surface of the instrument panel 80 over a wide area. This limits movement of the airbag 11 in the lateral direction of the vehicle. Accordingly, the airbag 11 stably protects the vehicle occupant P who is forced toward the middle portion of the instrument panel 80.

(2) The protection portion 14 includes the protection portion body 15 and the projection 16, which is located at a position corresponding to at least the head H of the vehicle occupant P (D). The projection 16 comes into contact with the head H. Thus, as shown in FIG. 7, the vehicle occupant P (D) does not directly hit the inclined surface 82 of the instrument panel 80 due to the protection portion body 15. Further, contact of the projection 16 with the head H of the vehicle occupant P (D) restricts head rotation.

(3) The projection 16 includes the upper projection 17, which comes into contact with the head H of the vehicle occupant (D), and the lower projection 18, which is located below the upper projection and comes into contact with the shoulder S of the vehicle occupant P (D). Thus, as shown in FIG. 7, the head H of the vehicle occupant P (D) contacts the upper projection 17, and the shoulder S contacts the lower projection 18. This appropriately restricts head rotation and appropriately restrains the shoulder S.

(4) As shown in FIG. 5B, the projection 16 includes the through hole 19, which extends in the lateral direction of the vehicle. The side surfaces of the projection 16 between the upper projection 17 and the lower projection 18 forms the narrowed portion 20, which includes the through hole 19.

This structure allows the surface area of the upper projection 17 and the surface area of the lower projection 18 to be easily changed by changing the location and size of the narrowed portion 20. Thus, the area in which the upper projection 17 and the lower projection 18 contact the head H and shoulder S of the vehicle occupant P (D) may be set in an appropriate manner to appropriately protect the head H and the shoulder S of the vehicle occupant P (D).

(5) The projection 16 is located at the middle portion of the protection portion body 15 with respect to the lateral direction of the vehicle. Thus, when another automobile collides at an angle with either the left or right side of the front of an automobile including the center airbag of the present embodiment, the projection 16 will contact the head H of the vehicle occupant D on the driver seat 91 or the head H of the vehicle occupant P on the passenger seat 92 who is forced toward the middle portion of the instrument panel 80. This restricts head rotation.

It should be apparent to those skilled in the art that the present invention may be embodied in many other specific forms without departing from the spirit or scope of the invention. Particularly, it should be understood that the present invention may be embodied in the following forms.

The portion of the protection portion body 15 located toward the passenger seat 92 from the projection 16 may be decreased in volume or be omitted. In this case, the projection 16 is arranged at the portion of the protection portion body 15 located toward the driver seat 91 from the middle portion of the protection portion body 15 with respect to the lateral direction of the vehicle.

Figure 8:
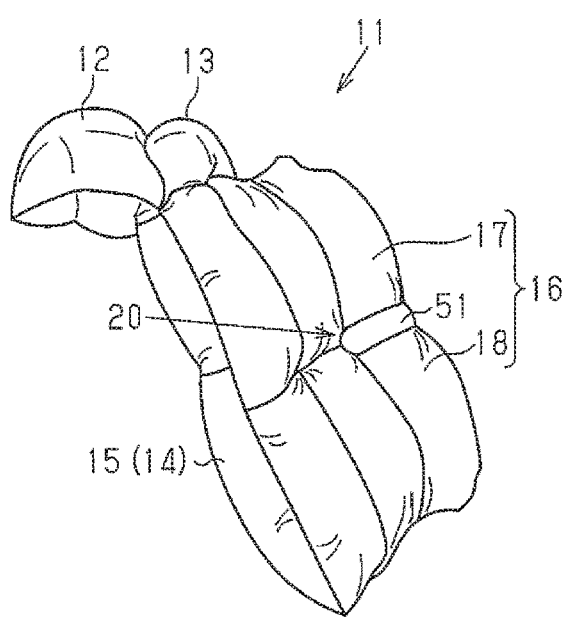
FIG. 8 is a side view of a modified airbag taken from the driver seat.

The through hole 19 may be omitted, and a tether 51 may be arranged between the upper projection 17 and the lower projection 18 as shown in FIG. 8. In this case, the tether 51 forms the narrowed portion 20 between the upper projection 17 and the lower projection 18. The tether 51 may be located inside the airbag 11.

Figure 9:
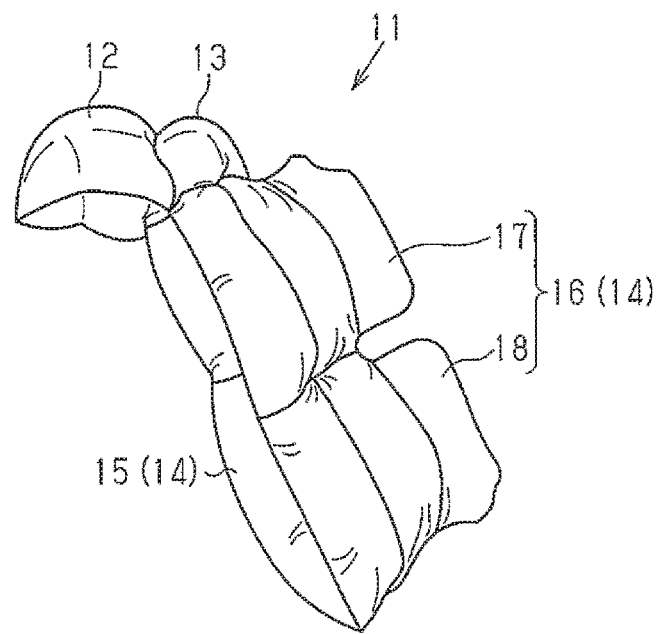
FIG. 9 is a side view of another modified airbag taken from the driver seat.

As shown in FIG. 9, the upper projection 17 and the lower projection 18 may be separated from each other.

The narrowed portion 20 between the upper projection 17 and the lower projection 18 may be omitted.

Figure 10:
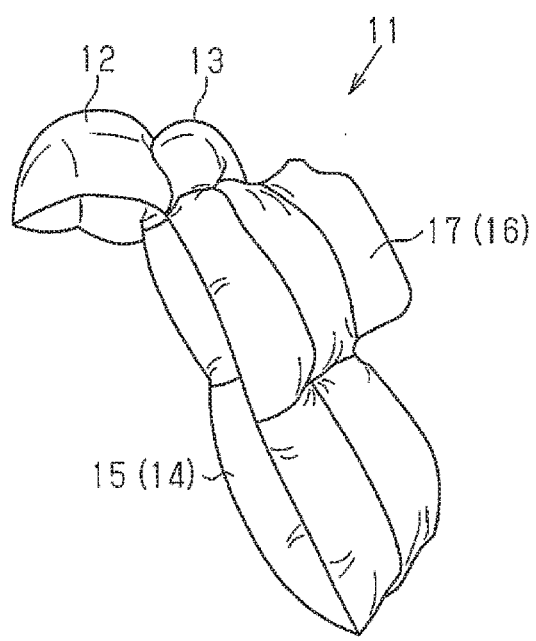
FIG. 10 is a side view of a further modified airbag taken from the driver seat.

As shown in FIG. 10, the lower projection 18 may be omitted so that the projection 16 includes only the upper projection 17.

A plurality of basal portions may be located next to each other in the front-rear direction. For example, in the center airbag device 10 shown in FIG. 11, two basal portions 12A and 12B are arranged next to each other in the front-rear direction. In this case, the front basal portion 12A is located directly above the storage 83, and the auxiliary portion 13 is located between the rear basal portion 12A and the protection portion 14. A tether 45, which includes a hole 45a, partitions the front basal portion 12A and the rear basal portion 12B. A constricted portion 46, which includes a constricted outer surface, is located between the front basal portion 12A and the rear basal portion 12B.

When the storage 83 is located at a position separated toward the front from the vehicle occupant, the length of the basal portion increases in the front-rear direction. This makes it difficult for the basal portion to be deployed and inflated along the upper surface 81 of the instrument panel 80 such that the airbag 11 easily moves in the lateral direction of the vehicle.

Figure 11:
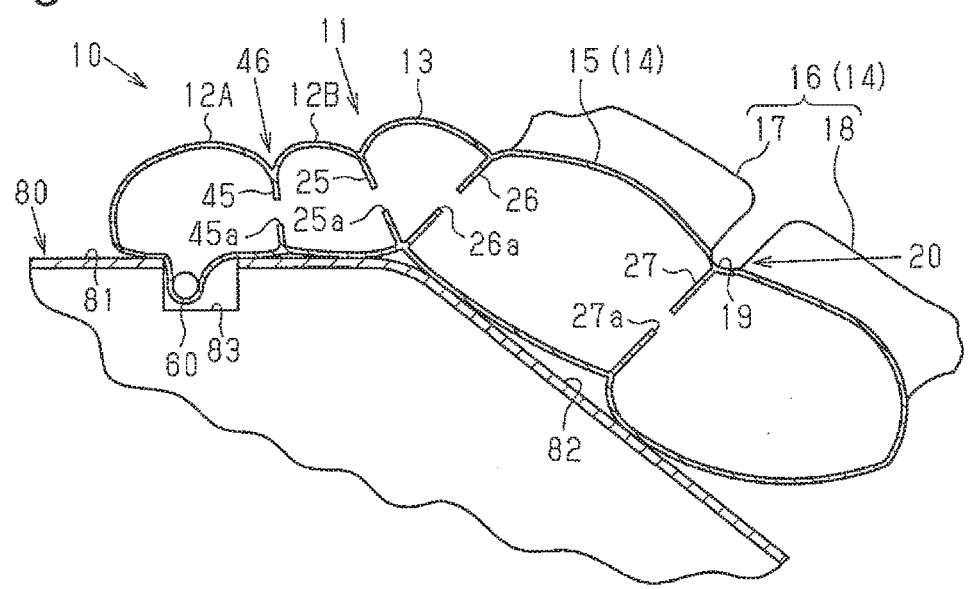
FIG. 11 is a cross-sectional view of the instrument panel and a further modified airbag when deployed and inflated.

In this respect, the airbag 11 shown in FIG. 11 includes the constricted portion 46 between the basal portion 12A and 12B, which are located next to each other. This allows the basal portions 12A and 12B to move relative to each other and allows the basal portions 12A and 12B to easily extend along the upper surface 81 of the instrument panel 80 even when the basal portions 12A and 12B are entirely decreased in volume. Accordingly, the basal portions 12A and 12B and, consequently, the airbag 11 may be reduced in size. Further, the area of contact between the upper surface 81 of the instrument panel 80 and the basal portions 12A and 12B may be increased. This limits movement of the airbag 11 in the lateral direction of the vehicle.

In the airbag 11 shown in FIG. 11, the front basal portion 12A has a larger volume than the rear basal portion 12B. Thus, when the airbag 11 is inflated and expanded, the front basal portion 12A, which has a large volume, forces the rear basal portion 12B out toward the rear. Further, the front basal portion 12A serves as a wall that restricts upward movement of the rear basal portion 12B or returning of the front basal portion 12A toward the front.

The projection 16 may be omitted so that the protection portion 14 includes only the protection portion body 15.

The present examples and embodiments are to be considered as illustrative and not restrictive, and the invention is not to be limited to the details given herein, but may be modified within the scope and equivalence of the appended claims.

The invention claimed is:

1. A center airbag device arranged in an instrument panel of a vehicle and located in a middle portion of the instrument panel with respect to a lateral direction of the vehicle, the center airbag device comprising:
   an airbag deployed and inflated when supplied with gas, wherein the airbag includes
      a basal portion located on an upper surface of the instrument panel when the airbag is deployed and inflated,
      a protection portion located rearward from the basal portion and extended downward when the airbag is deployed and inflated, the protection portion faces and directly contacts an inclined surface of the instrument panel in response to a contact of a vehicle occupant with the airbag after the airbag is deployed and inflated; and
      an auxiliary portion located between the basal portion and the protection portion, wherein the auxiliary portion allows the protection portion to be bent relative to the basal portion when the airbag is deployed and inflated,
   wherein the protection portion includes a first fabric, a second fabric, a third fabric, and a fourth fabric,
   the first fabric is vertically opposed to the second fabric,
   the third fabric is vertically opposed to the fourth fabric,
   a rear end of the first fabric and a front end of the third fabric are joined,
   a rear end of the second fabric and a front end of the fourth fabric are joined,
   a rear end of the third fabric and a rear end of the fourth fabric are joined, and
      the second fabric and the fourth fabric of the protection portion extend along the inclined surface of the instrument panel.

2. The center airbag device according to claim 1, wherein the protection portion includes
   a protection portion body, and
   a projection located at a position adapted to receive at least a head of the vehicle occupant, wherein the projection projects from the protection portion body and is configured to contact the head.

3. The center airbag device according to claim 2, wherein the projection includes
   an upper projection that is configured to contact the head of the vehicle occupant, and
   a lower projection located downward from the upper projection, wherein the lower projection is configured to contact a shoulder of the vehicle occupant to restrain the shoulder.

4. The center airbag device according to claim 3, wherein the airbag includes a narrowed portion between the upper projection and the lower projection.

5. The center airbag device according to claim 4, wherein
   the upper projection is in communication with the lower projection, and
   the airbag includes a through hole extending through the airbag in the lateral direction of the vehicle, wherein the through hole is located between the upper projection and the lower projection.

6. The center airbag device according to claim 4, wherein the airbag includes a tether located between the upper projection and the lower projection.

7. The center airbag device according to claim 2, wherein the projection is located in a middle portion of the protection portion body with respect to the lateral direction of the vehicle.

8. The center airbag device according to claim 1, wherein
   the basal portion is one of a plurality of basal portions located next to each other in a front-to-rear direction of the vehicle, and
   the airbag includes a constricted portion between the basal portions that are located next to each other, wherein the constricted portion includes a constricted outer surface.

9. The center airbag device according to claim 8, wherein a front one of the basal portions has a larger volume than a rear one of the basal portions.

10. The center airbag device according to claim 2, wherein the protection portion covers substantially the entirety of the inclined surface of the instrument panel, wherein the inclined surface extends diagonally downward and toward a rear of the vehicle from a rear edge of the upper surface.

11. The center airbag device according to claim 1, wherein the protection portion directly contacts and faces an ornamental portion of the inclined surface of the instrument panel, wherein the inclined surface extends diagonally downward and toward a rear of the vehicle from a rear edge of the upper surface.

12. The center airbag device according to claim 11, wherein the protection portion covers substantially the entirety of the ornamental portion of the inclined surface of the instrument panel, wherein the inclined surface extends diagonally downward and toward a rear of the vehicle from a rear edge of the upper surface.

13. A center airbag device arranged in an instrument panel of a vehicle and located in a middle portion of the instrument panel with respect to a lateral direction of the vehicle, the center airbag device comprising:
  an airbag deployed and inflated when supplied with gas, wherein the airbag includes
    a basal portion located on an upper surface of the instrument panel when the airbag is deployed and inflated,
    a protection portion located rearward from the basal portion and extended downward when the airbag is deployed and inflated, the protection portion faces and directly contacts an inclined surface of the instrument panel in response to a contact of a vehicle occupant with the airbag after the airbag is deployed and inflated; and
    an auxiliary portion located between the basal portion and the protection portion, wherein the auxiliary portion allows the protection portion to be bent relative to the basal portion when the airbag is deployed and inflated,
  wherein the protection portion includes
  a protection portion body, and
  a projection located at a position adapted to receive at least a head of the vehicle occupant, wherein the projection projects from the protection portion body and is configured to contact the head,
  wherein the projection includes
  an upper projection that is configured to contact the head of the vehicle occupant, and
  a lower projection located downward from the upper projection, wherein the lower projection is configured to contact a shoulder of the vehicle occupant to restrain the shoulder, and wherein the upper projection and the lower projection are arranged in a line,
  wherein a width of the projection is narrower than a width of the protection portion body.

14. The center airbag device according to claim 13, wherein the upper projection has a height from the inclined surface of the instrument panel that is the same as a height of the lower projection from the inclined surface of the instrument panel.

* * * * *